United States Patent [19]
Lindner et al.

[11] 4,456,734
[45] * Jun. 26, 1984

[54] RUBBER POWDERS

[75] Inventors: Christian Lindner, Cologne; Karl-Heinz Ott, Leverkusen, both of Fed. Rep. of Germany

[73] Assignee: Bayer Aktiengesellschaft, Leverkusen, Fed. Rep. of Germany

[*] Notice: The portion of the term of this patent subsequent to Dec. 20, 2000 has been disclaimed.

[21] Appl. No.: 337,064

[22] Filed: Jan. 4, 1982

[30] Foreign Application Priority Data

Jan. 13, 1981 [DE] Fed. Rep. of Germany ....... 3100748

[51] Int. Cl.$^3$ .......................................... C08F 265/06
[52] U.S. Cl. ................... 525/310; 525/309; 523/201; 524/458
[58] Field of Search ............... 523/201; 524/458, 460, 524/533, 534; 525/902, 309, 310

[56] References Cited

U.S. PATENT DOCUMENTS

| | | | |
|---|---|---|---|
| 3,787,522 | 1/1974 | Dickie | 260/836 |
| 3,833,682 | 9/1974 | Dickie | 525/309 |
| 3,959,408 | 5/1976 | Yusa | 525/902 |
| 3,985,703 | 10/1976 | Ferry | 523/201 |
| 4,026,970 | 5/1977 | Backderf | 525/902 |
| 4,141,932 | 2/1979 | Butler | 260/880 R |
| 4,247,434 | 1/1981 | Lovelace | 523/201 |
| 4,264,678 | 4/1981 | Nelsen | 525/902 |
| 4,265,939 | 5/1981 | Tebbens | 525/902 |

FOREIGN PATENT DOCUMENTS 2319655 2/1977 France .
1520338 8/1978 United Kingdom .

*Primary Examiner*—Paul R. Michl
*Attorney, Agent, or Firm*—Connolly and Hutz

[57] ABSTRACT

Free-flowing rubber powders of particles having an average diameter of from 0.01 to 10 mm which contain a grafted-on shell of the polymer or copolymer of one or more vinyl monomers in a quantity of from 2 to 20% by weight, based on the rubber, which rubber is a latex polymer of which the latex particles consist essentially of from 99 to 80% by weight of acrylate rubber having glass transition temperatures below 0° C. and from 1 to 20% by weight of polymer having glass transition temperatures above 0° C. grafted thereon, and a process for their production, wherein the latex of the rubber is completely broken to form an aqueous suspension of the rubber, after which from 2 to 20% by weight, based on the rubber, of one or more vinyl monomers which form polymers having glass transition temperatures above 25° C. are introduced into the suspension and the monomer(s) is/are polymerized, optionally after the addition of a radical-forming catalyst.

4 Claims, No Drawings

RUBBER POWDERS

This invention relates to free-flowing rubber powders and to a process for the production thereof.

Rubber powders have to flow freely to ensure problem-free incorporation, compounding, processing, storage and handling of the polymers. For example, synthetic rubbers which tend to stick to one another are powdered or coated with talcum, $TiO_2$ or $SiO_2$. However, such auxiliaries may adversely affect the properties of the polymers.

German Offenlegungsschrift No. 2,801,817 describes a process for improving the handling properties of elastic graft rubbers by coagulating a vinyl polymer at the surface of the rubber particles. Although the rubber particles themselves are also coagulated, they are not separated from the coagulation medium. This process requires a separate polymerisation stage for the vinyl polymer, and additionally the ungrafted vinyl polymer alters the properties of the graft rubber.

European Pat. No. 0 009 250 describes a modified process in which an organic solvent is used in addition to the vinyl polymer. This process has the same disadvantages, in addition to which the solvent has to be removed. If the known methods are applied to ungrafted rubbers, polymer mixtures having relatively poor properties are almost always formed.

It is also known (cf. East German Pat. No. 86,500) that a rubber latex containing residual monomer may be coagulated and the residual monomers (unwanted in this case) subsequently removed by polymerisation. Free-flowing rubber powder is not obtained in this way because the polymerised residual monomers lead to a polymer identical with the rubber.

It is known from German Offenlegungsschrift No. 2,843,068 that additional quantities of the monomers forming the graft shell may be polymerized in the presence of a suspension of an ABS graft copolymer.

The present invention relates to a process for the production of free-flowing rubber powders containing particles having an average diameter of from 0.01 to 10 mm wherein a latex of a rubber of which the latex particles consist essentially from 99 to 80%, by weight, preferably from 99 to 90%, by weight, of acrylate rubber having a glass transition temperature below 0° C. and from 1 to 20%, by weight, preferably from 1 to 10%, by weight, of polymer having glass temperatures above 0° C. grafted thereon is completely broken after which from 2 to 20%, by weight, preferably from 5 to 10%, by weight, based on the rubber, of one or more vinyl monomers which form polymers having glass transition temperatures above 25° C. are introduced into the suspension and the monomer(s) is/are polymerised, optionally after the addition of a radical initiator.

The present invention also relates to free-flowing rubber powders of particles having an average diameter of from 0.01 to 10 mm, preferably from 0.05 to 8 mm, more preferably from 0.1 to 4 mm, which contain a grafted-on shell of the polymers or copolymer of one or more vinyl monomer in a quantity of from 2 to 20%, by weight, preferably from 5 to 10%, by weight, wherein the rubber is a latex polymer of which the latex particles consist essentially of from 99 to 80%, by weight, of acrylate rubber having glass temperatures below 0° C. and from 1 to 20%, by weight, of polymer having glass temperatures above 0° C. grafted thereon.

According to the present invention, it is possible to use various rubbers derived from acrylates which accumulate in the form of aqueous emulsions (latex) and of which the latex particles contain small amounts of grafted-on polymer having glass temperatures above 0° C. The acrylates and the grafted-on polymers may be un-cross-linked, partially cross-linked or highly cross-linked independently of one another. Suitable acrylate rubbers are also those of the type which have so-called "core/shell" structure.

Particularly suitable acrylate rubbers are acrylic acid ester (co)polymers having glass transition temperatures below 0° C., more particularly below 20° C.

In the context of the present invention, acrylate rubbers are to be understood to be homopolymers and copolymers of $C_1$–$C_{12}$ alkyl acrylates, particularly methyl-, ethyl-, propyl-, n-butyl- or hexyl acrylate, and polymers consisting of at least 70% by weight of $C_1$–$C_{12}$ alkyl acrylate polymers. Suitable comonomers for the $C_1$–$C_{12}$ alkyl acrylates are, for example, styrene, acrylonitrile, alkyl methylacrylate, butadiene, isoprene, vinyl esters, vinyl ethers, vinyl carboxylic acid, allyl alcohol, allyl esters and allyl ethers. The acrylate rubbers may be completely or partially cross-linked, for example by polyfunctional vinyl or allyl monomers.

Preferred acrylate rubbers are emulsion polymers which have a gel content of more than 60%, by weight, and which have been cross-linked with polyfunctional and/or graft-cross-linking and/or graft-active monomers, for example triallyl (iso)cyanurate, allyl(meth)acrylate, and maleic acid allyl ester. Such acrylate rubbers are known (cf. German Offenlegungsschrift No. 2,256,301 and No. 2,558,476, German Auslegeschrift No. 2,624,656, European Patent No. 0 001 782).

Particularly suitable polymers having glass temperatures above 0° C. which are grafted onto these acrylate rubbers are homopolymers or copolymers of monomers, such as alkyl acrylates, alkyl methacrylates, styrene, acrylonitrile, methyl styrene, acrylonitrile or vinyl acetate.

Rubber latices of this type which contain the latex particles described above are produced, for example, by emulsion polymerisation or emulsion graft polymerisation. However, they may also be produced by preparing an acrylate rubber as such or in solution, grafting on a polymer having glass transition temperatures above 0° C. and then converting these rubbers into an aqueous emulsion which is suitable for the process according to the present invention.

The process according to the present invention may be carried out as follows:

To begin with, an aqueous emulsion of an acrylate rubber containing small quantities of polymer having glass temperatures above 0° C. grafted thereon is produced.

The thus-produced emulsion is then completely broken, for example by means of electrolytes (such as acids or bases), mechanical action or heating. Coagulation with aqueous solutions of acids and/or salts at temperatures of from 30° to 100° C. is preferred. A heterogeneous suspension of discrete polymer particles varying in size and shape in water is obtained. The shape and size of the particles may be influenced by varying the precipitation conditions.

The vinyl monomer(s), such as styrene, acrylonitrile, alkyl methacrylate, acrylic acid, methacrylic acid, vinyl acetate and, optionally, regulators, radical initiators (particularly water-soluble persulphates) or oxidation inhibitors are then introduced into the rapidly stirred polymer suspension, preferably at temperatures of from 30° to 100° C., and radically polymerised. The addition of suspending agents is unnecessary and should be avoided.

Finally, the polymer according to the present invention is isolated, for example by filtration or centrifuging, and then dried.

The process according to the present invention may be carried out in batches, semi-continuously or continuously.

The polymer powders according to the present invention are storable, free-flowing and non-tacky. They may be processed particularly easily and economically, for example by compounding in the melt, to form for example elastomers, rubber and highly flexible plastics, etc.

EXAMPLES

1. Production of acrylate rubber emulsions 1.1. The following components are introduced into a reactor at 63° C.:
   5000 parts, by weight, of water
   2 parts, by weight, of sodium sulphonate of $C_{14}$–$C_{18}$ hydrocarbons
   14 parts, by weight, potassium persulphate
   0.9124 part, by weight, of triallyl cyanurate
   399.0876 parts, by weight, of n-butyl acrylate The following mixtures are then introduced into the reactor over a period of 5 hours at 63° C.:

Mixture 1: 90 parts, by weight, of the sodium sulphonate of $C_{14}$–$C_{18}$ hydrocarbons 11,900 parts, by weight, of water Mixture 2: 23.09 parts, by weight, of triallyl cyanurate 10100.91 parts, by weight, of n-butyl acrylate.

Polymerisation is then completed over a period of 2 hours at 65° C. The polymers formed have gel contents above 85%, by weight.

1.2. The polymerisation procedure is as described in Example 1, except that 200 parts, by weight, of a polybutadiene rubber emulsion having a solids content of from about 35 to 36%, by weight, are introduced into the reactor instead of the 2 parts, by weight, of sodium sulphonate.

1.3. The following mixture is introduced with stirring into a reactor at 63° C.:
   5000 parts, by weight of water
   5 parts, by weight, of potassium persulphate
   100 parts, by weight, of methyl methacrylate
   300 parts, by weight, of ethyl hexyl acrylate
   2 parts, by weight, of the sodium sulphonate of $C_{14}$–$C_{18}$ hydrocarbons The following mixtures are separately introduced into the reactor over a period of 4 hours at 63° C.:

Mixture 1: 90 parts, by weight, of the sodium sulphonate of $C_{14}$–$C_{18}$ hydrocarbons 11,900 parts, by weight, of water.

Mixture 2: 400 parts, by weight, of methyl methacrylate 9724 parts, by weight, of ethyl hexyl acrylate.

Polymerisation is then completed over a period of 3 hours at 65° C.

2. Production of emulsions containing grafted acrylate rubbers:

2.1 The following components are introduced into a reactor:
   3296 parts, by weight of latex 1.1.
   1.5 parts, by weight, of potassium persulphate
   90 parts, by weight, of water The following solutions are introduced into the reactor over a period of 4 hours at 65° C.

Solution A: 146 parts, by weight, of methyl methacrylate

Solution B: 150 parts, by weight, of water 3 parts, by weight, of the sodium sulphonate of $C_{14}$–$C_{18}$ hydrocarbons.

Polymerisation is then completed over a period of 3 hours at 65° C.

2.2. The procedure is as in Example 2.1, except that latex 1.2. is used instead of latex 1.1.

2.3. The procedure is as in Example 2.1. except that latex 1.3 is used instead of latex 1.1.

2.4. The procedure is as in Example 2.1, except that a mixture of 42 parts, by weight, of acrylonitrile and 105 parts, by weight, of styrene is used as solution A.

3. Production of the rubber powders according to the present invention:

3.1 The following components are introduced into a reactor at 70° C.:
   18800 parts, by weight, of water
   245 parts, by weight, of magnesium sulphate The following quantity of latex is then run into the reactor with stirring over a period of 2 hours:
   11200 parts, by weight, of latex 2.1.

On completion of the addition, 4 parts, by weight, of potassium persulphate are introduced into the reactor, after which 462 parts, by weight, of methyl methacrylate are uniformly introduced with stirring over a period of 1 hour. The suspension is then stirred for 3 hours at 80° C. after which the polymer is isolated.

3.2. The procedure is as described in Example 3.1 except that, instead of methyl methacrylate, a mixture of 130 parts, by weight, of acrylonitrile and 340 parts, by weight, of styrene is introduced into the rubber suspension.

3.3. The procedure is as described in Example 3.1, except that latex 2.2. is used instead of latex 2.1.

3.4 The procedure is as in Example 3.1 except that latex 2.3 is used instead of latex 2.1.

3.5. The procedure is as in Example 3.1 except that latex 2.4 is used instead of latex 2.1.

4. Characterisation of the products 3

The polymer suspensions are worked-up at room temperature in a laboratory centrifuge the chamber of which has an internal diameter of 30 cm and which is operated at 1500 r.p.m. The following procedure is adopted:

The polymer suspensions described in the above Examples are introduced into the centrifuge in such a quantity that 1 kg of polymer solids may be isolated per cycle. The contents of the centrifuge are then washed with water for 20 minutes with the centrifuge in operation until the washing water running off is substantially free from electrolyte. The product is then spin-dried for 5 minutes. The water content of the spin-dried material is determined. Thereafter, the moist polymer is placed on metal plates and dried in hot-air drying cabinets for 24 hours at 70° C.

The thus-obtained polymers are characterised in regard to their pulverulence and tackiness.

| Polymer | Residual water content after spin-drying (%, by weight) | Characterisation of the dry polymer |
|---|---|---|
| 3.1 | 35 | free-flowing powder which does not become tacky on storage |
| 3.2 | 28 | free-flowing powder which does not become tacky on storage |
| 3.3 | 35 | free-flowing powder which does not become tacky on storage |
| 3.4 | 30 | free-flowing powder which does not become tacky on storage |
| 3.5 | 36 | free flowing powder which does not become tacky on storage |

The results set out in the above Table show that the polymers according to the present invention are distinguished by advantageous powder properties from which the materials benefit greatly in their various technological applications.

We claim:

1. A process for the production of a free-flowing rubber powder containing particles having an average diameter of from 0.01 to 10 mm, said process comprising completely breaking a latex of a rubber whose particles consist essentially of 99 to 80%, by weight, of an acrylate rubber having a glass transition temperature of below 0° C. and from 1 to 20%, by weight, of a polymer having a glass transition temperature above 0° C. so as to form an aqueous suspension of said rubber, then introducing into said aqueous suspension from 2 to 20% by weight, based on the rubber, of at least one vinyl monomer which forms a polymer having a glass transition temperature of about 25° C., and then polymerizing said vinyl monomer in the optional presence of a radical-forming catalyst.

2. The process of claim 1 wherein said rubber is a homo- or co-polymer of at least one alkyl acrylate having rubber properties.

3. The process of claim 1 wherein said polymer having a glass transition temperature above 0° C. is a polymer of at least one monomer selected from the group consisting of styrene, methyl styrene, acrylonitrile, alkyl acrylate, alkyl methacrylate and vinyl acetate.

4. The process of claim 1 wherein said vinyl monomer is selected from the group consisting of styrene, acrylonitrile, alkyl methacrylate and mixtures thereof.

* * * * *